United States Patent [19]

Mock

[11] 4,276,124
[45] Jun. 30, 1981

[54] DISTILLATION SYSTEM FOR SEA WATER

[75] Inventor: Arthur E. Mock, East Wenatchee, Wash.

[73] Assignee: Haakon Haakonsen, White Plains, N.Y. ; a part interest

[21] Appl. No.: 596,820

[22] Filed: Jul. 17, 1975

[51] Int. Cl.³ ............................................. B01D 1/14
[52] U.S. Cl. ...................................... 202/236; 203/7; 203/49; 202/DIG. 1; 159/8
[58] Field of Search ............... 202/236, 185 R, 185 B, 202/DIG. 1, 182, 205; 159/4 E, 4 VM, 8–10, 16, 4 S; 203/10, 49, 7, DIG. 14; 34/63, 76, 77; 62/92; 23/307; 261/92; 165/112; 210/208, 219

[56] References Cited

U.S. PATENT DOCUMENTS

| | | | |
|---|---|---|---|
| 2,036,929 | 4/1936 | Durnell | 261/92 |
| 2,040,837 | 5/1936 | D'Yarmett | 202/236 X |
| 2,044,976 | 6/1936 | Fasting | 159/8 |
| 2,403,978 | 7/1946 | Hickman et al. | 202/236 |
| 2,902,414 | 9/1959 | Schmerzler | 203/49 |
| 2,921,004 | 1/1960 | Wood | 159/4 E |
| 3,177,126 | 4/1965 | Charreau | 203/49 |
| 3,189,531 | 6/1965 | Hack et al. | 202/205 |
| 3,358,739 | 12/1967 | Pinkerton et al. | 203/49 |
| 3,385,574 | 5/1968 | Lohman | 261/92 |
| 3,404,539 | 10/1968 | Leonard, Jr. | 202/236 X |
| 3,522,151 | 7/1970 | Dismore | 159/4 VM |
| 3,860,492 | 1/1975 | Lowi | 203/49 |

FOREIGN PATENT DOCUMENTS 1222739 of 1960 France ...................................... 159/9 R

*Primary Examiner*—Hiram Bernstein

[57] ABSTRACT

A distillation system for sea water is provided with a fan to force air under pressure through a heating chamber having a heat exchanger to heat the air, a passageway from the heating chamber for directing the heated and pressurized air to an evaporator in which a reservoir of sea water is maintained at a predetermined level and in which cylindrical horizontally disposed brushes are partially submerged in the sea water and rotated as the heated air from the heating chamber passes over the rotating brushes with the brushes rotated at a sufficiently high speed to keep the brushes wet thereby preventing the formation of scale on the brushes. The moisture laden heated air then flows through a condenser which includes a heat exchanger utilizing sea water as the cooling medium and includes an outlet valve which permits the condensed water to be withdrawn for use. A pressure regulating valve between the condenser and evaporator causes higher pressures in the evaporator and heating compartment and a lower pressure in the condenser. The dry air from the condenser is then withdrawn through a passageway and returned to the heating chamber by the fan. A second stage evaporator having rotating brushes similar to those in the first stage receives sea water from the reservoir in the first evaporator through a level regulating valve which maintains a predetermined level of sea water in a second stage evaporator reservoir. An air ejector withdraws the moisture vapor and gases from the second stage evaporator and causes them to flow through a second stage condenser where a portion of the moisture is condensed for use and the remaining moisture and gases are withdrawn through the air ejector.

11 Claims, 3 Drawing Figures

DISTILLATION SYSTEM FOR SEA WATER

This invention is in the field of distillation and is specifically directed to a system for efficiently distilling sea water without encountering the usual scaling difficulties.

Previous distillation systems have evaporated the sea water from heated surfaces thereby creating scaling on the heated surfaces as the water is vaporized. Other systems have flashed sea water into vapor by introducing heated sea water into low pressure vessels thereby causing scale to develop in the flashing areas. The formation of scale within distillation equipment is a major problem because it requires frequent dismantling of the equipment to remove the scale and because the scale greatly decreases the efficiency of the evaporating units. The dismantling of these systems is expensive and time consuming and additionally decreases the output capability of the system. These previous systems have also required high energy inputs per gallon of condensate produced. Most of these prior systems have not been able to utilize waste heat from other shipboard systems because of their high operating temperatures.

Consequently, up until the time of the present invention, there has been a continuing need for a distillation system which is capable of efficiently and inexpensively producing distilled water from sea water sources as are encountered in many areas of the world. This system should not be subject to scaling which will interfere with its efficiency and should be capable of utilizing waste heat sources if they are available.

It is consequently the primary object of this invention to provide a new and improved distillation system for producing distilled water from sea water.

An additional object of the present invention is to provide a distillation system which is not subject to scaling during normal operating conditions.

A still further object of the present invention is to provide a two stage distillation system which decreases the energy required to distill sea water while preventing scaling.

A further object of the present invention is to provide a distillation system which utilizes heated air to evaporate moisture from sea water thereby avoiding the necessity of heating the water directly and causing scaling on the heated surfaces.

A still further object of the present invention is to provide a two stage distillation system which prevents scaling within the system thereby avoiding the expensive and capacity reducing characteristic inherent in dismantling a system to remove scale.

Another object of the present invention is to provide a two stage distillation system in which rotating brushes or the like provide increased evaporative surface for pressurized heated air to evaporate the water surface thereon and in which the moist heated air then passes to a low pressure condenser for condensation of the moisture.

An additional object is to provide a distillation system which may use natural sources of heat, such as the sun to supply domestic water for cities and irrigation water for farm lands.

The obtainment of the objects of this invention is enabled through the provision of a fan to force air under pressure through a heating chamber having a heated exchanger which may be heated by steam, exhaust gases, electricity or the like, a passageway from the heating chamber for directing the pressurized and heated air to an evaporator in which sea water is maintained at a predetermined level and in which cylindrical horizontally disposed brushes are partially submerged and rotated as the heated air from the heating chamber passes over the brushes. The brushes are rotated at sufficiently high speeds to keep the brushes wet which prevents the formation of scale on the brushes. The moisture laden air from the evaporator then flows through a pressure regulating valve which maintains a higher pressure in the heating chamber and the evaporator while causing a pressure drop as the moisture laden heated air flows into a condenser thereby creating a low pressure condenser which increases the efficiency of the system. The condenser includes a heat exchanger utilizing sea water as a cooling medium and includes an outlet valve which permits the condensed water to be withdrawn for use. The dry air from the condenser is then withdrawn by suction from the fan through a passageway and returned to the heating chamber where the pressure is again raised as the air flows through the fan and the system to complete another cycle. A second stage evaporator with rotating brushes similar to those in the first stage receives sea water from the sea water in the first evaporator through a level regulating valve which maintains a predetermined level of sea water in the second stage evaporator. Sea water flows continuously through the first stage and second stage evaporators to prevent a buildup of high concentrations of salt in the feed water which could result in scaling within the evaporator. An air ejector withdraws the moisture vapor from the second stage evaporator and causes it to flow through a second stage condenser where a portion of the moisture is condensed for use and the remaining moisture and gases are withdrawn through the air ejector.

A better understanding of the subject invention will be enabled when the following written description is read in conjunction with the appended drawings in which.

Figure 1:
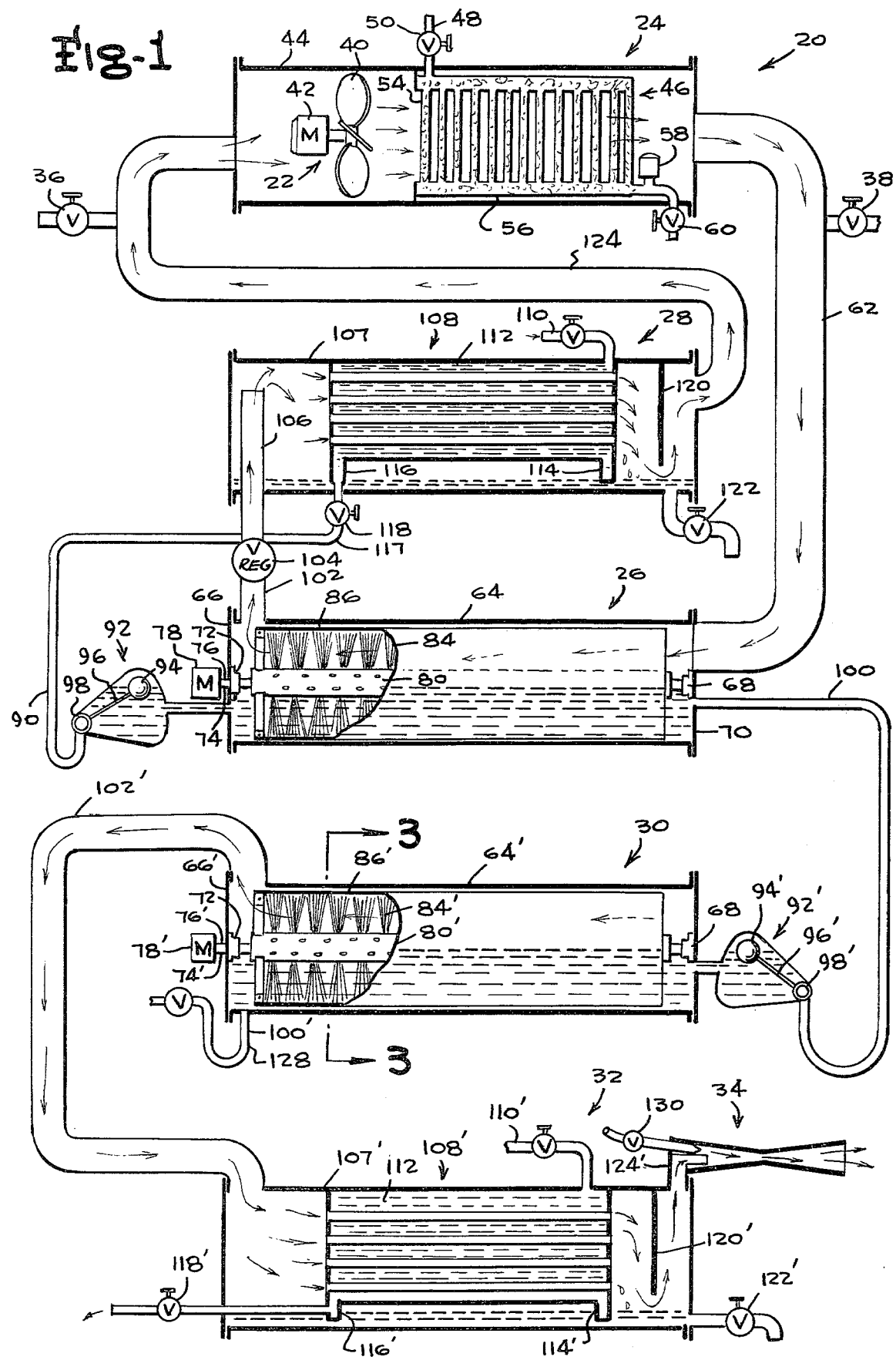
FIG. 1 is a schematic view of the preferred embodiment of the present invention.

Your attention is initially invited to FIG. 1 of the drawings which illustrate the preferred embodiment of the invention 20 including a blower fan 22, a heating chamber 24, a first stage evaporator 26, a first stage condenser 28, a second stage evaporator 30, a second stage condenser 32, and an air ejector 34.

Air is introduced into the system through an air inlet valve 36 and excess air in the system is removed through air outlet and pressure relief valve 38. The blower fan 22, which forces the air through the heating chamber 24, the first stage evaporator 26 and the first stage condenser 28, includes a fan blade 40 mounted on the shaft of a fan motor 42. The blower fan 22 is mounted in a cylindrical housing 44 with the tips of the fan blade 40 rotating in close proximity to the cylindrical housing 44 thereby permitting a buildup of pressure in the heating chamber 24 and the first stage evaporator 26.

Air from the blower fan is heated in the heating chamber 24 by a heat exchanger 46 having a steam inlet 48, a steam inlet shutoff valve 50, a steam header 52, steam passageways 54 around which the air to be heated flows and which connect with a condensate header 56. A steam trap 58 prevents steam from escaping through the condensate header 56 while permitting the condensate to flow through a condensate outlet valve 60. A high pressure air passageway 62 provides an outlet from the heating chamber 24 and connects with the first stage evaporator 26 to provide an inlet thereto.

Figure 2:
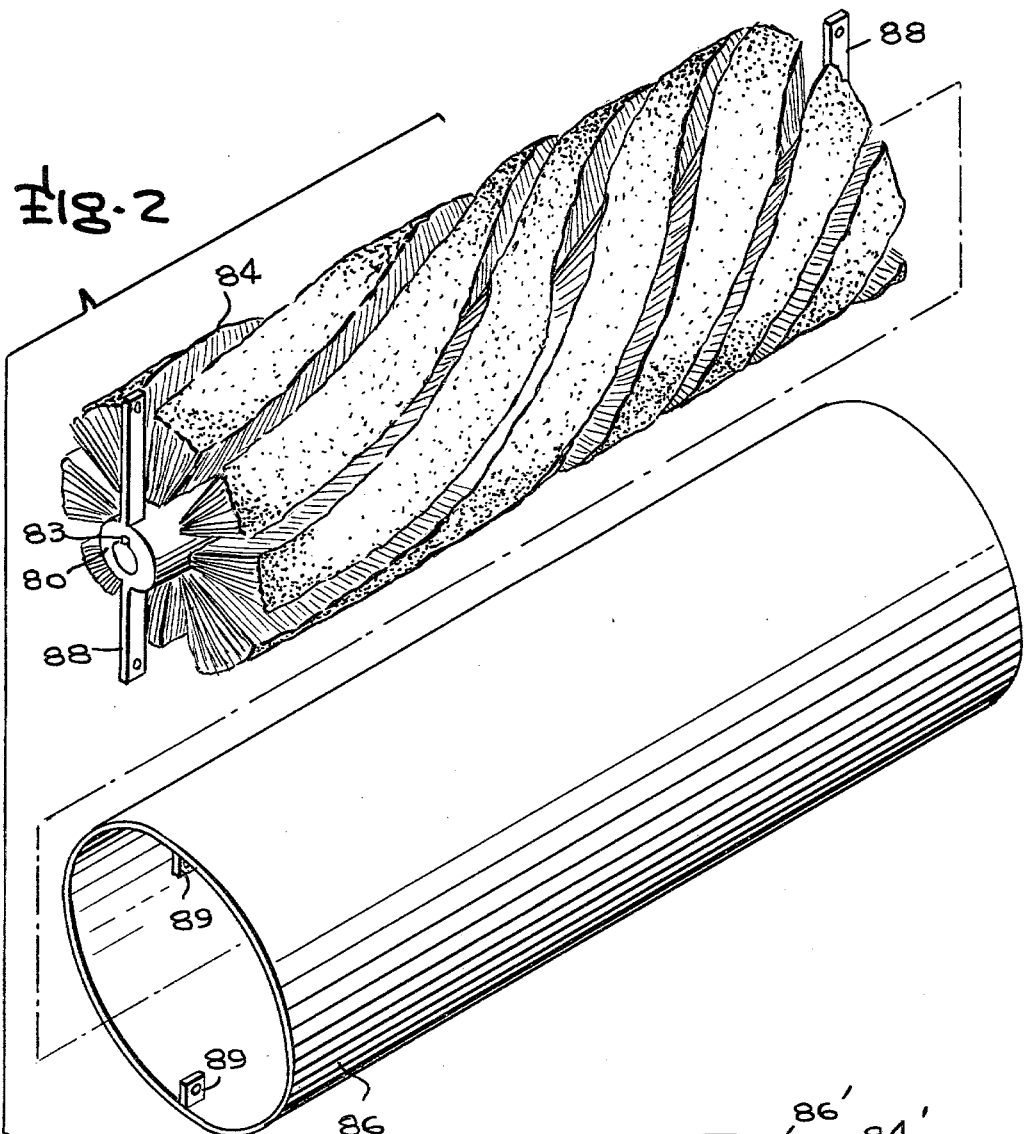
FIG. 2 is a perspective view illustrating a spine brush used in the evaporators of the preferred embodiment of the present invention.
Figure 3:
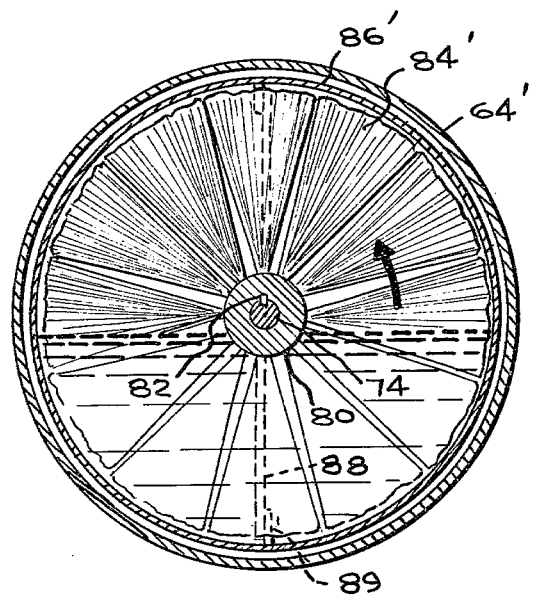
FIG. 3 is a sectional view of the spine evaporator.

The first stage evaporator 26 as shown in FIG. 3 includes a cylindrical evaporator housing 64 having a detachable head plate 66 bolted to an open end of the housing 64. A support bearing 68 is mounted at the center of the end wall 70 of the evaporator housing and a second support bearing 72 is mounted in the center of the head plate 66 to provide support for a drive shaft 74. A water tight gland 76 mounted at the center of the head plate 66 around the drive shaft prevents water from leaking out of the housing. The drive shaft 74 is rotated by a drive motor 78 which is shown schematically in FIG. 1. A spine wheel hub 80 as shown in FIGS. 2 and 3 is fixed to the shaft 74 by a key 82 extending from slot 83 in the hub 80 into the shaft 74 as shown in FIG. 3. Extending outwardly from the hub 80 are flexible spines 84 which are fixed to the hub in slow spiral rows as shown in FIG. 2 with the spines preferably formed of a material such as plastic, nylon, glass, wood or the like which does not corrode or rust. The spines breakup the surface tension of the water within the evaporators and since they become wet, each spine becomes an added evaporator surface.

The outer ends of the spines 84 form a cylindrical shape and are surrounded by a removable drum cover 86 which is formed of a thin durable material such as stainless steel. The drum cover 86 is fixed to the hub 80 by cover braces 88 which are fixed at one end to the hub and removably attached by bolts to mounting tabs 89 on the drum cover 86 at opposite ends of the hub 80 to cause rotation of the drum cover when the hub is rotated by drive motor 78.

Sea water is supplied to the first stage evaporator 26 through water inlet 90. The level of the sea water in the cylindrical evaporator housing 64 is controlled by a level regulator valve 92 which includes a float 94, an actuation lever 96, and an inlet valve 98. As the float 94 rises or falls, the inlet valve 98 is closed or opened to maintain the level of sea water in the evaporator housing at the desired level. Sea water outlet 100 permits the sea water to flow out of the first stage evaporator before it becomes too highly concentrated with salts as the result of the evaporation of water from the sea water solution. The first stage evaporator 26 is connected to the first stage condenser 28 by a passageway 102 having a pressure regulating valve 104 mounted in the passageway.

The pressure of the heated moist air from the first stage evaporator decreased as it flows through the pressure regulating valve into a first stage condenser inlet 106 thereby causing a lower pressure in the first stage condenser 28 then exists in the first stage evaporator 26 which increases the efficiency of condensation in the condenser because the decrease in pressure reduces the quantity of moisture which may be suspended in the air.

The first stage condenser 28 which utilizes sea water as a coolant includes a condenser housing 105 through which the condenser inlet 107 passes. A heat exchanger 108 is mounted in the condenser housing and includes a sea water inlet 110, cooling water passageways 112 around which the heated moist air flows to condense the water vapors in the air, an inlet header 114, an outlet header 116, an outlet 117, and an outlet control valve 118 to control the rate of flow of sea water through the heat exchanger. An air baffle 120 mounted at the outlet end of the condenser housing 107 insures adequate circulation of the moist heated air around the cooling passageways 112 to produce an efficient condensation of the water vapors contained in the air flowing through the condenser. Condensate accumulates at the bottom of the condenser housing and can be removed through condensate drain valve 112 as distilled water for drinking or other desired purposes.

The dry air from the first stage condenser then flows through return passageway 124 back to the cylindrical housing 44 to be recycled through the system. Sea water outlet 100 permits heated sea water in the first stage evaporator to flow into the second stage evaporator 30 which is identical to the first stage evaporator and has like components identified by a prime mark following the like number. The return passageway 102' from the second stage evaporator connects to the second stage condenser 32 which is identical to the first stage evaporator and has like components identified by like numbers followed by a prime mark. The return passageway 124' from the second stage condenser 32 is connected to the conventional air ejector 34 which maintains a vacumn on the second stage evaporator and condenser thereby causing the uncondensed vapors and gases to flow around the air baffle 120' and be drawn out through the air ejector 34.

Condensate valve 122' permits removal of the condensate from the second stage condenser for use as drinking water or the like. A conventional U-shaped air trap 128 in the outlet 100' from the second stage evaporator prevents air from entering the low pressure interior of the second stage evaporator. The outlet 117 from the first stage condenser is preferably connected to the sea water inlet 90 to the first stage evaporator thereby utilizing the heat absorbed by the sea water as it flows through the heat exchanger 108 of the first stage condenser. This preheating of the sea water before it enters the first stage evaporator increases the efficiency of the system by decreasing the amount of energy required.

Operation of the system is initiated by opening air inlet valve 36 to supply air to the system. Steam inlet shutoff valve 50 is opened thereby permitting steam to enter the heat exchanger 46. Cooling sea water is admitted to the first stage condenser heat exchanger 108 through sea water inlet 110 with the outlet control valve 118 set for the desired rate of flow. The evaporator drive motors 78 and 78' are energized to cause the spines 84 and 84' and removable drum covers 86 and 86' to rotate within the cylindrical evaporator housings 64 and 64'. Cooling sea water is admitted through inlet 110' to the second stage condenser with the rate of flow through the condenser being controlled by outlet control valve 118'. Steam is admitted to the air ejector 34 by the air ejector inlet valve 130 which causes the air ejector 34 to draw a vacuum on the second stage condenser and evaporator.

Rotation of the fan blade 40 by the fan motor 42 causes the air in the cyclindrical housing 44 to be forced through the heat exchanger 46 where the pressurized air is heated by the steam which flows through the heat exchanger. The heated pressurized air then flows through the high pressure air passageway 62 to the first stage evaporator 28 where it enters the cylindrical evaporator housing 64. The level regulator valve 92 maintains the sea water in the first stage evaporator at a level which submerges the spines 84, as indicated in FIG. 3 as the spines are rotated by the drive motor 78. The spines tend to propel the sea water from the cooler end of the evaporator which is at inlet 90 to the warmer end at outlet 100 as the heated pressurized air flows through the evaporator to evaporate the water from the wetted spines as the spines rotate through the sea water contained in the lower portion of the housing 64.

The moisture laden air then flows through passageway 102 where its pressure is decreased by pressure regulating valve 104 before it enters the first stage condenser 28. As the moist heated air flows around the first stage condenser heated exchanger 108 at reduced pressures, the water vapor contained in the air condenses out on the cooling water passageways 112 and collects in the bottom of the condenser to be withdrawn through the condensate valve 122 for use. The dry air then returns from the first stage condenser through the return passageway 124 to the cylindrical housing 44 where its pressure is increased as it flows through rotating fan blade 40 to begin a second cycle through the system. The heated sea water from the first stage evaporator flows through outlet 100 and through level regulating valve 92'.

The maximum temperature of the sea water in the first stage evaporator should be maintained at approximately 150° F. to 200° F. to avoid scale buildup and to operate the system at maximum efficiency. Sea water from the first stage condenser is admitted to the first stage evaporator at a flow rate which is sufficient to maintain this temperature. A constant flow of sea water through the evaporator prevents the concentration of salt in the sea water.

The heated sea water from the first stage evaporator flows through the second stage evaporator with the level being maintained by the level regulator valve 92' to keep the lower spines submerged. The spines on the first and second stage evaporators are rotated at sufficiently high speeds by drive motors 78 and 78' to prevent the formation of scales on the spines by keeping the spines wet at all times which flushes off the high concentration of salts resulting from water evaporating from the wetted surfaces of the spines 84 and 84' and the removable drum covers 86 and 86'. The spines and removable drum covers significantly increase the evaporative surface exposed to the heated, pressurized air in the first stage and the vacuum of the second stage which significantly decreases the size and increases the efficiency of the system.

The air ejector 34 of the second stage draws a vacuum on the second stage condenser 32 and evaporator 30 which causes the sea water in the second stage evaporator to vaporize and be drawn through outlet passageway 102' and into the second stage condenser where the moisture vapors are condensed on the cooling water passageways 112 to create a condensate which may be withdrawn through condensate valve 122 for use. The air ejector 34 then withdraws any remaining moisture vapor and gases which may have escaped from the sea water in the second stage evaporator.

The sea water from the second stage evaporator is then discharged through outlet 100', through air trap 128 and then may be returned to the sea if the system is installed on a ship. The constant flow of sea water through the evaporators prevents any large increases in the concentration of salts.

Cleaning the evaporators is easily accomplished by removing the retaining bolts from the head plate 66 and extracting the spine assemblies. Multiple evaporator units may be utilized if desired to maintain constant operation of a system while any individual evaporator is being cleaned. The pressure relief valve 38 relieves any excessive pressure in the system.

It is to be understood that numerous modifications of the disclosed embodiment of the subject invention, such as operation of the first stage of the system without the second stage and such as the heat in the heating chamber 24 being provided by solar energy or the like, will undoubtedly occur to those with skill in the art and the spirit and scope of the invention is limited solely in light of the appended claims.

I claim:

1. A nonscaling distillation system particularly adapted for distilling sea water, said system comprising a pump means for circulating air through the system, a heating means communicating with the outlet of the pump means for raising the temperature of the air, a first evaporator having evaporator surfaces, communicating with the heating means, and directing the heated air from the heating means against the evaporator surfaces, means for frequently flushing all of the evaporator surfaces with sea water to prevent a build-up of scale on the evaporator surfaces, a first condenser, a passageway between the first evaporator and the first condenser for directing the heated and pressurized air from the first evaporator to the first condenser, a pressure regulating valve in the passageway for maintaining the pressure in the condenser at a significantly lower pressure than the pressure in the first evaporator, and a return passageway for communicating the first condenser with the pump means thereby providing a distillation system in which pressurized air from the pump means may be heated in the heating means, flowed through the evaporator where it evaporates a portion of the sea water on the evaporator surfaces, flowed through the pressure regulating means at decreased pressures as it enters the first condenser where the water vapors are condensed, and returned to the inlet of the pump means as dry air.

2. The distillation system of claim 1 wherein the first evaporator includes a retaining vessel, a first level regulating means for maintaining a predetermined level of sea water in the vessel and the flushing means includes a brush mounted for rotation in the first evaporator with the brush submerged in the sea water at least to the axis of rotation of the brush, means for rotating the brush at speeds which cause a flushing of all of the surfaces of the brush and the retaining vessel before any of the surfaces have dried, an inlet to the level regulating means and an outlet from the first evaporator thereby permitting a constant flow of sea water through the first evaporator to flush the brush as the sea water is evaporated and eliminate a concentration of the salts on the brushes.

3. The distillation system of claim 2 wherein the brush includes a hub rotatable about a generally horizontal axis and spines which are spirally mounted on the hub.

4. The distillation system of claim 3 wherein the spines form a cylindrical brush and wherein a cylindrical drum cover fixed to the hub surrounds the outer periphery of the brush adjacent the ends of the spines.

5. The distillation system of claim 1 wherein the first condenser includes a heat exchanger with flow passageways for sea water which connect with an inlet to the first evaporator to provide sea water to the flushing means at an elevated temperature thereby improving the efficiency of the system.

6. The distillation system of claim 3 wherein the sea water inlet to the first evaporator and the inlet from the heating means are at one end of the brush and the sea water outlet and the air outlet to said passageway are at the opposite end of the brush thereby causing circulation of both sea water and air by the brush as a result of the rotation of the brush and the spiral of the spines on the hub.

7. The distillation system of claim 1 additionally including a second evaporator having a vapor outlet, a sea water inlet to the second evaporator, a second condenser having an inlet communicating with the vapor outlet from the second evaporator and an air ejector which evacuates the second condenser thereby causing the vapors from the second evaporator to flow through the second condenser.

8. The distillation system of claim 7 wherein the second evaporator includes a retaining vessel, a second level regulating means for maintaining a predetermined level of sea water in the vessel, a brush mounted for rotation with a portion of the brush submerged as it rotates through the fluid, an inlet to the second level regulating means and an outlet from the second evaporator thereby permitting a constant flow of sea water through the second evaporator to flush the brush as the sea water is evaporated to prevent a concentration of salts on the brush.

9. The distillation system of claim 8 wherein the brush in the second evaporator includes a hub which rotates about a generally horizontal axis and spines which are spirally mounted on the hub.

10. The distillation system of claim 9 wherein the spines form a cylindrical brush and wherein a cylindrical drum cover fixed to the hub surrounds the outer periphery of the brush adjacent the ends of the spines.

11. The distillation system of claim 7 wherein the sea water outlet from the first evaporator connects with the sea water inlet to the second evaporator thereby providing sea water to the second evaporator at an elevated temperature to improve the efficiency of the system.

* * * * *